United States Patent [19]

Kawamura et al.

[11] Patent Number: 5,849,856
[45] Date of Patent: Dec. 15, 1998

[54] WATER SOLUBLE RESINS AND APPLICATION THEREOF TO PAPER COATING

[75] Inventors: Akira Kawamura; Akira Tanikawa; Toshiyuki Hasegawa; Sonoe Sato, all of Osaka, Japan

[73] Assignee: Sumitomo Chemical Company Limited, Osaka, Japan

[21] Appl. No.: 835,934

[22] Filed: Apr. 11, 1997

[30] Foreign Application Priority Data

Apr. 12, 1996 [JP] Japan .................................. 8-090967
Apr. 19, 1996 [JP] Japan .................................. 8-098057

[51] Int. Cl.$^6$ .................................................... C08G 18/32
[52] U.S. Cl. ................................ 528/49; 528/68; 528/75; 528/407; 528/418; 525/419; 525/426; 525/455; 525/540; 428/425.1; 428/479.6; 428/511; 524/589; 524/608; 524/612; 106/287.25; 162/157.2; 162/157.3; 162/157.4
[58] Field of Search .................................. 528/49, 75, 68, 528/418, 407; 525/455, 419, 426, 540; 428/425.1, 479.6, 511; 524/589, 608, 612; 106/287.25; 162/157.2, 157.3, 157.4

[56] References Cited

U.S. PATENT DOCUMENTS 5,521,240   5/1996   Yoshida et al. ........................ 524/217

*Primary Examiner*—Rachel Gorr
*Attorney, Agent, or Firm*—Pillsbury Madison & Sutro LLP

[57] ABSTRACT

A water soluble resin obtainable by reacting at least two reactants comprising a polyamine and a urea compound, or at least four reactants comprising a polyamine, a urea compound, a dibasic carboxylic acid compound and a lactam; and then reacting the reaction product with at least one compound selected from among epihalohydrins, α,γ-dihalo-β-hydrins, glycidyl compounds and isocyanates. The resultant the water soluble resin is useful for making a paper coating composition, such as by being mixing that resin with a pigment and an aqueous binder. The paper coating composition does not generate formaldehyde and can be used to manufacture coated papers exhibiting improved properties including excellent water resistance.

11 Claims, No Drawings

WATER SOLUBLE RESINS AND APPLICATION THEREOF TO PAPER COATING

BACKGROUND OF THE INVENTION

1. Field of the Invention

The present invention relates to a water soluble resin, a paper coating composition comprising the water soluble resin, and a paper having a coating thereon formed from that composition. More particularly, the paper coating composition comprises the present water soluble resin and a pigment and an aqueous binder.

2. Background Information

Coated papers obtained by applying a coating composition containing a pigment and an aqueous binder onto a paper, followed by working up the paper by necessary treatments such as drying, calendering and so on, have found wide use in the manufacture of commercial pamphlets, magazines and books. These coated papers have been so used due to their characteristics such as excellent printing effects or the like.

Despite this usage, there are ever increasing demands for still higher quality and for increased printing speed which provide a strong impetus for further research directed to satisfying these market driven needs. These on-going efforts include trying to develop suitable improvements, and particularly for offset printing because that system is one used for the majority of printed material. Among the sought after improvements are better ink acceptability under the influence of moistening water and water resistance, such as wet pick-up and blister resistance, during rotary press printing. The art has clearly long sought solutions to the twin problems of ink acceptability and of water resistance in the paper industry.

A number of techniques have been proposed to address these long-standing art-recognized problems. Among the proposals is the addition of a melamine-formaldehyde resin, a urea-formaldehyde resin, a polyamidopolyurea-formaldehyde resin such as is described in JP-B-44-11667, or the addition of a block glyoxal resin as is described in JP-A-63-120197 or the like as a water resistance agent or an additive for binder have been proposed. While these conventional water resistance agents and additives for binders may offer some benefits, they also have notable deficiencies in performance due to inadequate properties or an inadequate balance of properties. For example, so-called aminoplast resins, such as melamine-formaldehyde resins and urea-formaldehyde resins suffer from a number of problems. These resins generate large amounts of formaldehyde during processing or from coated papers. These resins also provide inadequate improvements to ink acceptability and blister resistance. They are also less effective in water resistance when the coating composition had a higher pH value. On the other hand, while block glyoxal resins, which are known as formaldehyde-free binder additives, may provide water resistance to moistening water to some extent, they offer almost no improvement in ink acceptability and blister resistance. Therefore these proposals have not proven satisfactory from the practical standpoint.

Despite the foregoing and other extensive studies, the above described long standing problems remain.

SUMMARY OF THE INVENTION

An object of the present invention is to provide paper coating compositions which can be used to manufacture higher quality coated papers, such as papers having coatings exhibiting a high level of ink acceptability and high water resistance.

Another object of the present invention is to provide a water soluble resin adapted for making paper coating compositions and which is free of formaldehyde.

A further object of the present invention is to provide a resin adapted for making paper coating compositions which are capable of having excellent ink adhesion and water resistance.

The present invention accomplishes these and other objects with a water soluble resin (A) obtainable by reacting at least two members comprising a polyamine (a) selected from the classes of alkylene diamines and polyalkylene polyamines and a urea compound (b) to form a reaction product; and then reacting the reaction product with a cross-linking compound (c) selected from the classes of glycidyl compounds having at least two glycidyl groups per molecule and isocyanates.

In the reaction for producing the water soluble resin (A), one or more additional compounds, such as a dibasic carboxylic acid compounds (d), an alicyclic compound (e) selected from the class of alicyclic amines having at least one activated hydrogen and the class of alicyclic epoxy compounds, and a compound (f) selected from the classes of epihalohydrins and $\alpha,\gamma$-dihalo-$\beta$-hydrins, can further be added in addition to the polyamine (a), urea (b) and cross-linking compound (c).

The present invention also provides a water soluble resin (B) which is obtainable by reacting at least four members comprising a polyamine (g) selected from the classes of alkylene diamines and polyalkylene polyamines, a urea compound (h), a dibasic carboxylic acid compound (i) and a lactam (j) to obtain a reaction product, and then reacting the reaction product with a cross-linking compound (k) selected from the classes of epihalohydrins, $\alpha,\gamma$-dihalo-$\beta$-hydrins, glycidyl compounds and isocyanates.

In the reaction for producing the water soluble resin (B), additional compounds, such as an alicyclic compound (l) selected from the classes of alicyclic amines having at least one activated hydrogen and alicyclic epoxy compounds, can further be added in addition to said polyamine (g), urea (h), dibasic carboxylic acid (i), lactam (j) and cross-linking compound (k).

The water soluble resin (A) and water soluble resin (B) obtainable in the above manners are particularly useful as an ingredient in a paper coating composition, which can be used to provide with good properties to the coated paper. Accordingly, the present invention further provides a paper coating composition comprising the water soluble resin (A) or water soluble resin (B) as an active ingredient. A combination of water soluble resins (a) and (b) can also be used.

The water soluble resin (A) and water soluble resin (B) are particularly useful formulating a paper coating composition comprising, as additional ingredients, at least one pigment and at least one aqueous binder. Accordingly, a paper coating composition comprising (I) a pigment, (II) an aqueous binder, and (III) the water soluble resin (A) or water soluble resin (B) is part of our invention. Our paper coating compositions can be formulated wherein the water soluble resin (A) or water soluble resin (B) are used in the form of a mixture or a reaction product with other resins. Example of the other resins include an amide compound (C) obtainable by reacting an $\alpha,\gamma$-unsaturated carboxylic acid compound (x) with an amine (y) having a primary or secondary amino group.

DETAILED DESCRIPTION OF THE INVENTION

The water soluble resin (A) can be obtained by reacting the at least two members comprising a polyamine (a) selected from alkylene diamines and polyalkylene polyamines with a urea compound (b) to obtain a reaction product; and then allowing the reaction product to react with a cross-linking compound (c) selected from glycidyl compounds and isocyanates. A water soluble resin (B) can be obtained by reacting at least four members comprising a polyamine (g) selected from alkylene diamines and polyalkylene polyamines, a urea compound (h), a dibasic carboxylic acid compound (i) and a lactam (j) to obtain a reaction product, and then allowing the reaction product to react with a cross-linking compound (k) selected from epihalohydrins, α,γ-dihalo-β-hydrins glycidyl compounds and isocyanates.

Suitable polyamines (a) useful in the production of the water soluble resin (A) and the polyamines (g) useful in the production of the water soluble resin (B), independent of one another, include a compound having two primary amino groups, both are linked through an alkylene group and which may be interrupted by one or more secondary amino groups. Suitable polyamine (a) and polyamine (g) compounds include, for instance, independent of one another, alkylene diamines, preferably containing 1 to 6 carbon atoms, such as ethylenediamine, 1,2-propanediamine, 1,3-propanediamine and hexamethylenediamine and polyalkylene polyamines such as diethylenetriamine, triethylenetetramine, tetraethylenepentamine, pentaethylenehexamine, iminobispropylamine, 3-azahexane-1,6-diamine and 4,7-diazadecane-1,10-diamine. From the industrial standpoint, a preferred polyamine (a) is at least one of diethylenetriamine, triethylenetetramine and tetraethylenepentamine. Likewise, from the industrial standpoint, a preferred polyamine (g) is at least one of tetraethylenepentamine and pentaethylenehexamine. As used herein, a single polyamine or a mixture of polyamines can be used as a polyamine (a) or as a polyamine (g).

The urea compound (b) and urea compound (h) are independent of one another and represent urea or a urea derivative. The suitable derivatives can, in general, be a group represented by the formula: —NHC(=Q) NHR wherein Q is oxygen or sulfur and R is hydrogen or an alkyl group having about 1–4 carbon atoms. Suitable R groups include, for instance, methyl, ethyl, n-propyl, i-propyl, n-butyl, i-butyl and t-butyl. The urea compound (b) and urea compound (h) can, for example, be compounds represented by the formula $R^1$NHC(=Q) NHR, wherein $R^1$ is hydrogen, and alkyl group having about 1–4 carbon atoms, or a guanyl group, and Q and R as defined above. The urea compound (b) and urea compound (h) can include, for instance, urea, thiourea, guanylurea, methylurea and dimethylurea. The urea compound (b) or urea compound (h) can also be used independently (and singly) or as a combination of a suitable urea and/or any of the urea derivatives. From the industrial view point, urea is preferred. The urea compound (b) is used in an amount generally within a range of about 0.3 to about 1 times the molar quantity, preferably within a range of about 0.4 to about 1 times the molar quantity, of the total molar amount of primary and secondary amino groups in the polyamine (a). The urea compound (h) is used in an amount generally within a range of about 0.3 to about 1 times the molar quantity, preferably within a range of about 0.5 to about 1 times the molar quantity, of the total molar of primary and secondary amino groups in the polyamine (g).

The dibasic carboxylic acid compounds (d) optionally used for the production of the water soluble resin (A) and dibasic carboxylic acid compounds (i) can be at least one a compound having two carboxylic groups in the molecule or a compound derived from such a compound. These compounds include, for example, the free acids as well as suitable ester or acid anhydrides. These suitable compounds can be aliphatic, aromatic and alicyclic compounds. Examples of the free dibasic carboxylic acid compounds include aliphatic dicarboxylic acids such as succinic acid, glutaric acid, adipic acid, sebacic acid, maleic acid and fumaric acid; aromatic dicarboxylic acids such as phthalic acid, isophthalic acid and terephthalic acid; and alicyclic dicarboxylic acids such as tetrahydrophthtalic acid, hexahydrophthalic acid, cyclohexane-1,3-dicarboxylicacid, cyclohexane-1,4-dicarboxylic acid, cyclopentane dicarboxylic acid, 3-methyltetrahydrophthalic acid, 4-methyltetrahydrophthalic acid, 3-methylhexahydrophthalic acid and 4-methylhexahydrophthalic acid. When the alicyclic group has an unsaturated bond and the position of the unsaturated bond is not specified, it is to be understood that the position of the unsaturated bond is optional. For instance, tetrahydrophalic acid can have the double bond either at 0-position or at the m-position relative to the carboxyl group.

As above-stated, the dibasic carboxylic acid compound (d) and dibasic carboxylic acid compounds (i) are not limited to these free acids and esters or acid anhydrides can also be used. Suitable esters include, for example, mono-esters or di-esters of the above described free acids with lower alcohols and polyesters of the above described free acids with glycols. Lower alcohols useful in ester preparation include monoalcohols having 1 to 6 carbon atoms, particularly methanol, ethanol, propanol, and butanol. The polyester reaction products of dibasic carboxylic acids with glycols, are advantageously used as the dibasic carboxylic acid compounds (d) or dibasic carboxylic acid compounds (i). Polyesters, having at least one free carboxylic group are preferred. Examples of the glycols used here include alkylene glycols such as ethylene glycol, propylene glycol and butanediol; cycloalkylene glycols such as cyclopentanediol and cyclohexanediol; alkenylene glycols such as butenediol and octenediol; polyalkylene glycols such as diethylene glycol, dipropylene glycol, triethylene glycol, polyethylene glycol and polytetramethylene glycol; and ethylene oxide adducts of bisphenol A. A polyester having a free carboxylic acid at the end of molecule can be obtained by using a dibasic carboxylic acid in molar excess in the reaction of the carboxylic acid with a glycol.

Suitable acid anhydrides include, for instance, the anhydrides of the above-mentioned acids, and thus also succinic anhydride, phthalic anhydride, tetrahydrophthalic anhydride, hexahydrophthalic anhydride, 3-methyltetrahydrophthalic anhydride, 4-methyltetrahydrophthalic anhydride, 3-methylhexahydrophthalic anhydride and 4-methylhexahydrophthalic anhydride.

The dibasic carboxylic acid compound (d) and dibasic carboxylic acid compounds (i), if used need not be the same, and thus these can be used independently of one another (and thus singly) or can be used in the form of combinations of two or more suitable compounds. In general, the dibasic carboxylic acid compound (d) is used in an amount of about 1 mole or less and preferably 0.5 mole or less based on 1 mole of the polyamine (a). Similarly, in general, the dibasic carboxylic acid compound (i) is used in an amount within a range of from about 0.1 to about 1 mole, and preferably within a range from about 0.2 to about 0.8 mole, based on 1 mole of the polyamine (g).

The lactam (j) is a cyclic compound having a —CONH— group in the lactam ring. The lactam (j) usually has 5 to 12 carbon atoms in the lactam ring. By preference, the lactam (j) is one which is industrially practical and available such as ε-caprolactam and lauryllactam. In general, the lactam (j) is used in an amount within a range from about 0.01 to about 0.3 mole, and preferably within a range from about 0.03 to about 0.2 mole, based on 1 mole of the polyamine (g).

The cross-linking compound (c) is selected from the classes of glycidyl compounds having at least two glycidyl groups per molecule and isocyanate compounds. The cross-linking compound (k) is selected from epihalohydrins, α,γ-dihalo-β-hydrins, glycidyl compounds and isocyanates. In general, the glycidyl compounds can have two or more glycidyl groups in a molecule. Suitable glycidyl compound include, for instance, alkylene glycol diglycidyl ethers such as ethylene glycol diglycidyl ether, propylene glycol diglycidyl ether and neopentyl glycol diglycidyl ether; polyoxyalkyleneglycol diglycidyl ethers such as polyethylene glycol diglycidyl ether and polypropylene glycol diglycidyl ether; aromatic diglycidyl ethers such as resorcin diglycidyl ether and bisphenol A diglycidyl ether; trimethylol propane diglycidyl ether; trimethylol propanetriglycidyl ether; sorbitoldiglycidyl ether; sorbitol triglycidyl ether; sorbitol tetraglycidyl ether; sorbitol pentaglycidyl ether; sorbitol hexaglycidyl ether; pentaerythritol diglycidyl ether; pentaerythritol triglycidylether; and pentaererythritol tetraglycidyl ether. A small amount of a monoglycidyl compound, such as epichlorohydrin, may also be included.

In general, the isocyanate crosslinker usually has at least two isocyanate groups in a molecule. The polyisocyanate crosslink may include a small amount of mono-isocyanate functional copound. Suitable isocyanate crosslinkers include alicyclic isocyanates such as isophorone diisocyanate, 3-(2 isocyanatocyclohexyl)propyl isocyanate, bis(isocyanatomethyl)cyclohexane, isopropylidenebis(cyclohexyl isocyanate), transeyclohexane-1,4-diisocyanate and bicycloneplane triisocyanate; aliphatic isocyanates such as hexamethylene diisocyanate, trimethylhexane-1,6-diisocyanateand methyl 2,6-diisocyanatohexanoate (also called lysine diisocyanate); and aromatic isocyanates such as tolylene diisocyanate, triphenylmethane triisocyanate, tris (isocyanatophenyl)thiophosphate, phenylene diisocyanate, dianisidine diisocyanate and diphenyl ether diisocyanate.

The optional cross-linking compound (k) and the optional compound (f) which can be used in the production of the water soluble resin (A), can, independent of one another, comprise at least one epihalohydrin represented by the following general formula:

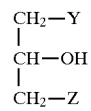

wherein X is a halogen atom and w is 1, 2 or 3. X can represent any halogen atom, although bromine and chlorine are preferred. By preference, the epihalohydrins include epichlorohydrin and epibromohydrin. These epihalohydrins can be used independently (for (f) or (k)), singly or as a combination of two or more epihalohydrins.

The optional cross-linking compound (k) and the optional compound (f) which can be used in the production of the water soluble resin (A), can also, independent of one another, be at least one α,γ-dihalo-β-hydrins represented by the following general formula:

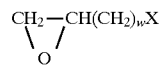

wherein Y and Z, which are the same or different, are each halogen atoms. Y and Z can be any halogen atom, but bromine and chlorine are preferred. As suitable α,γ-dihalo-β-hydrins include 1,3-dichloro-2-propanol. The cross-linking compound (c) and the cross-linking compound (k) can also be used independent of one another, singly, or as a combination of two or more compounds having the foregoing formula. The crosslinking compound (c) and crosslinking compound (k) can consist of one kind of compound, or, alternatively, they may consist of two or more compounds selected from the same chemical class. These crosslinkers can also be used such that the two more cross-linking compounds belong to different chemical classes can be used. For instance, combinations of epihalohydrins, α,γ-dihalo-β-hydrins, glycidyl compounds and isocyanates can, if desired, be used.

A cross-linking effective amount of the cross-linker compounds is generally used. The cross-linking compound (c) is used in an amount generally within a range of about 0.1 to about 2 moles, preferably within a range of about 0.2 to about 1 mole, based on 1 mole of the polyamine (a). The cross-linking compound (k) is used in an amount generally within a range of about 0.1 to about 2 moles, preferably within a range of about 0.2 to about 1 mole, based on 1 mole of the polyamine (g).

The alicyclic compound (e) optionally used for the production of the water soluble resin (A) or among the alicyclic compound (1) optionally used for the production of the water soluble resin (B), can be an alicyclic amine having at least one activated hydrogen and, generally, at least one alicyclic ring having 5–8 carbon atoms, preferably a cyclohexane ring, or two alicyclic rings each having about 5–6 ring carbon atoms, preferably two cyclohexane rings, as well as at least one primary or secondary amino group. The two alicyclic rings may be directly linked or may be indirectly linked though an intervening linking group such as —O—, —S—, sulfo and a bivalent alkylene group having 1–6 carbon atoms. The amino group may attach to the alicyclic ring either directly or indirectly though an intervening linking group such as alkylene, e.g., an alkylene group having 1–6 carbon atoms. Suitable alicyclic amines having at least one activated hydrogen include among others, cyclohexylamine, dicyclohexylamine, N-methylcyclohexylamine, 1,3-diaminocyclohexane, 1,4-diaminocyclohexane, 4,4'-diamino-3,3'-dimethyldicyclohexyl methane, 4,4'-diamino-3,3'-dimethylbicyclohexyl ethane, isophoronediamine, 1,3-bis(aminomethyl)cyclohexane, 1,2-bis(aminomethyl)cyclohexane, 1,4-bis(aminomethyl)cyclohexane, N-aminopropylcyclohexylamine, 1,5-bis(aminomethyl)-octahydro-4,7-methanoindene, 2,6-bis(aminomethyl)-octahydro-4,7-methanoindene, 2,2-bis(4-aminocyclohexyl) propane, bis(4-aminocyclohexyl)methane, 4,4'-oxybis (cyclohexylamine), 4,4'-sulfonebis(cyclohexylamine), 1,3, 5-triaminocyclohexane, 2,4'-diamino-3,3',5,5'-tetramethyldicyclohexylmethane, 4,4'-diamino-3,3',5,5'-tetramethyldicyclohexylmethane, menthanediamine, N-methyl-1,3-diaminocyclohexane, N,N-dimethyl-1,3-diaminocyclohexane, 3-N-methylamino-3,5,5-trimethyl-cyclohexylamine and N,N-dimethylbis(4-aminocyclohexyl) methane.

The alicyclic compound (e) optionally used for the production of the water soluble resin (A) or among the alicyclic compound (1) optionally used for the production of the water soluble resin (B), can also be an alicyclic epoxy compound which, in general, has an alicyclic ring having about 5–12 ring carbon atoms as well as an epoxy group. Suitable rings having 5–12 carbon atoms are as above-stated for the alicyclic amine. The epoxy group may be formed either between intra-alicyclic adjacent carbon atoms or be a substituent to or on the alicyclic ring. The epoxy group substituent can be bonded directly to the alicyclic ring or indirectly, for example, in the form of a glycidyl, glycidyloxy or glycidylcarbonyl group. Suitable alicyclic epoxy compounds include, for instance, cyclohexeneoxide, vinylcyclohexenedioxide, bis(3,4-epoxycyclohexyl) adipate, 3,4-epoxycyclohexylmethyl, 3,4-epoxycyclohexane-carboxylate, 3-(3,4-epoxycyclohexyl)-8, 9-epoxy-2,4-dioxaspiro[5.5]undecane, diglycidylhexahydrophthalate and 2,2-bis(4-glycidyloxycyclohexyl) propane.

These alicyclic compound (e) and alicyclic compound (1) can be used independently of one another, and thus singly, or also as a combination of any two or more suitable alicyclic compounds. The alicyclic amine and the alicyclic epoxy compound can be used in combination as the alicyclic compound (e) or alicyclic compound (1). The alicyclic compound (e) is used in an amount generally about 1 mole or less, preferably about 0.5 mole or less, based on 1 mole of the polyamine (a). The alicyclic compound (1) is used in an amount generally 1 mole or less, preferably about 0.5 mole or less, based on 1 mole of the polyamine (g).

In the production of water soluble resin (A), the optional dibasic carboxylic acid compounds (d) can, in general be used in the reaction of the polyamine (a) with the urea compound (b). The alicyclic compound (e) may be used in the reaction of the polyamine (a) with the urea compound (b) as well as in the reaction with the cross-linking compound (c). Further, the compound (f) is generally used in the reaction with the cross-linking compound (c).

A preferred water soluble resin (A) can be obtained, for example, by allowing a polyamine (a) to be condensed with the urea compound (b), and then reacting the reaction product thereof with the cross-linking compound (c). If desired, the alicyclic compound (e) can be added to the reaction in an optional reaction step such as, for instance, to the reaction of (a) and (b) as well as or, in the alternative, to the reaction of (a), (b) and (c).

In the condensation reaction of the polyamine (a) and the urea compound (b), the urea compound (b) can either be charged in one portion (one-step procedure or embodiment), or a portion of the selected amount of the urea compound (b) can be charged first to react with the polyamine (a), after which the remainder of the urea compound (b) is added to carry out further deammoniation (two-step procedure or embodiment). When the urea compound (b) is charged in one portion ("one shot") for reaction, the reaction is carried out at a temperature usually of about 80° to about 180° C., preferably at least about 90° to about 160° C., for about 1 to about 15 hours, while removing the generated ammonia from the system. When the reaction of the polyamine (a) with the urea compound (b) is carried out according to the above-mentioned two-step embodiment, each of the first and second reaction steps is carried out at a temperature which is usually in the range of about 80° to about 180° C., preferably about 90° to about 160° C., while removing the generated ammonia from the system. The reaction temperatures can be the same or different. In the two-step embodiment, the reaction period is suitably about 1 to about 6 hours for the first step and about 1 to about 15 hours for the second step.

The product thus obtained is then allowed to react with the cross-linking compound (c). The reaction with the cross-linking compound (c) is generally carried out in an aqueous solution having a reactant concentration, relative to all ingredients, including "the product thus obtained and the reaction solvent of about 10 to about 80% by weight at a temperature of about 50° to about 100° C., preferably about 70° to about 90° C., for about 1–10 hours, preferably about 3 to about 8 hours. When two or more kinds of the cross-linking compounds (c) are used, these may be reacted either concurrently or separately. When the compounds (c) are separately reacted, it is preferred that each of the reactions is carried out under the above described conditions.

When the optional alicyclic compound (e) is added to the reaction, the reaction of alicyclic compound (e) may be carried out at any step. For example, the alicyclic compound (e) may be added during the condensation reaction of the polyamine (a) with the urea compound (b) so that the three members are reacted simultaneously. Alternatively, the alicyclic compound (e) may be added after completion of the condensation reaction of the polyamine (a) with the urea compound (b) and before the reaction with the cross-linking compound (c). Further, the alicyclic compound (e) can be added during the reaction of the cross-linking compound (c) with the condensate of the polyamine(a)- and the urea compound (b). When the alicyclic compound (e) is an alicyclic amine, the alicyclic amine may be reacted with a portion of the urea compound (b) to carry out a deammoniation reaction and, then, the reaction product is further reacted with the polyamine (a) and the remainder of the urea compound (b). The deammoniation-condensation reaction of the urea compound (b) with the alicyclic amine is carried out at a temperature which is usually in the range of about 80° to about 180° C., preferably about 90° to about 160° C., for about 1 to about 15 hours while removing the generated ammonia from the reaction system.

Another preferred water soluble resin (A) can be obtained by reacting the polyamine (a), the urea compound (b) and the dibasic carboxylic acid compound (d), followed by reacting the reaction product with the cross-linking compound (c). If desired, the alicyclic compound (e) can be added to the reaction in an optional step. The order in which the polyamine (a), the urea compound (b) and the dibasic carboxylic acid compound (d) are reacted is not critical, and can be varied. Also in this reaction, the urea compound (b) may either be charged in one portion (one step procedure), or a portion of the urea compound (b) is first charged for deammoniation and, then, the remainder of the urea compound (b) is added for further deammoniation (two step procedure). For example, the reaction may, if desired, be carried out by reacting the polyamine (a) and the dibasic carboxylic acid (d) whereby a dehydration or dealcoholation reaction is conducted, after which the reaction product is allowed to react with the urea compound (b) whereby a deammoniation reaction is conducted; by reacting a part of the urea compound (b) and the polyamine (a) to carry out a deammoniation reaction and, then, reacting the reaction product with the dibasic carboxylic acid compound (d) to carry out a dehydration or dealcoholation reaction, followed carrying out a condensation reaction with the rest of the urea compound (b) to carry out a deammoniation reaction; by reacting the polyamine (a) and the dibasic carboxylic acid compound (d) in the presence of a part portion of the urea compound (b) to carry out a dehydration or dealcoholation and deammoniation and, then, reacting the reaction product with the rest of the urea compound (b) for carrying out a deammoniation; or the like.

The dehydration or dealcoholation is carried out at a temperature which usually is in the range of about 120° to about 250° C., preferably about 130° to about 200° C., for about 2 to about 12 hours, while removing the generated water or alcohol from the system. The deammoniation reaction is carried out at a temperature which is usually in a range of about 80° to about 180° C., preferably about 90° to about 160° C., for about 1 to about 15 hours, while removing the generated ammonia outside the system. When the polyamine (a), the urea compound (b) and the dibasic carboxylic acid compound (d) are reacted concurrently, the reaction is carried out usually at a temperature of about 80° to about 200° C., preferably about 90° to about 1 80° C., for about 2 to about 15 hours, while removing the generated water or alcohol and ammonia outside the system.

The reaction of the polyamine (a), the urea compound (b) and the dibasic carboxylic acid compound (d) gives a polyamidopolyurea, which is then subjected to the reaction with the cross-linking compound (c). The reaction with the cross-linking compound (c) is generally carried out in an aqueous solution having a reactant concentration, realtive to all the reactants and reaction solvent, of about 10 to about 80% by weight at a temperature of about 50° to about 100° C., preferably of 70° to about 90° C., for about 1 to about 10 hours, preferably about 3 to about 8 hours. When two or more kinds of the cross-linking compounds (c) are used, these may be reacted either concurrently or separately. When the compounds are separately reacted, it is preferred that each of the reactions is carried out under the above described conditions.

When the optional alicyclic compound (e) is added to the reaction, it can be reacted at any step. For example, the alicyclic compound (e) can be added in any step of the condensation reaction of three members: the polyamine (a), the urea compound (b) and the dibasic carboxylic acid compound (d), and reacted therewith. Alternatively, the alicyclic compound (e) may be added after the forming the polyamidopolyurea by the condensation reaction of the polyamine (a), the urea compound (b) and the dibasic carboxylic acid compound (d), but before the reaction of cross-linking compound (c). Further, the alicyclic compound (e) may be added during the reaction of the polyamidopolyurea with the cross-linking compound (c). When the alicyclic compound (e) is an alicyclic amine, the alicyclic amine can be condensed with a portion of the urea compound (b) and the reaction product can first be reacted with the polyamine (a), the rest of the urea compound (b) and the dibasic carboxylic acid compound (d). Alternatively, when the alicyclic compound (e) is an alicyclic epoxy compound, the alicyclic epoxy compound may be first subjected to an addition reaction with the polyamine (a), and the reaction product may be allowed to react with the dibasic carboxylic acid compound (d) and further with the urea compound (b). The latter reaction with compounds (d) and (b) can be concurrent or sequential. The addition reaction of the polyamine (a) with the alicyclic epoxy compound is usually carried out at a temperature of about 50° to about 100° C., preferably about 70° to about 90° C., for about 1 to about 10 hours.

When the compound (f) is used in any of the above reactions, part of the cross-linking compound (c) is replaced by the compound (f). It is then appropriate that the total amount of compound (c) and compound (f) be within the range described above for the cross-linking compound (c), i.e. within a range of about 0.1 to about 2 moles, preferably within a range of about 0.2 to about 1 mole, based on 1 mole of the polyamine (a). In any of the above reactions, the reaction with the compound (f) is carried out usually after the reaction of the polyamine (a), the urea compound (b) and, if used, the dibasic carboxylic acid compound is terminated. The reaction with the compound (f) can be carried out immediately before the reaction of the cross-linking compound (c), simultaneously with the reaction of the cross-linking compound (c), or after completion of the reaction of the cross-linking compound (c). The reaction with the compound (f) is generally carried out in an aqueous solution having a solid concentration of about 10–80% by weight, relative to the total amount of all the reactants and reaction solvent, at a weakly acidic to alkaline conditions, preferably at pH 5 or above, more preferably within a pH range of 7–12, and at a temperature of about 30° to about 80° C., for about 1 to about 10 hours.

In the production of the water soluble resin (B), generally a polyamine (g), a urea compound (h), a dibasic carboxylic acid compound (i) and a lactam (j) can be reacted in any particular order and, then, the reaction product is reacted with the cross-linking compound (k). If desired, the alicyclic compound (1) can be added to the reaction in an optional reaction step, such as to the reaction of (g)–(j) or to the reaction product of (g)–(j) and (k).

The order of the reaction of the polyamine (g), the urea compound (h), the dibasic carboxylic acid compound (i) and the lactam (j) is optional. Also in this reaction, the urea compound (h) may either be charged in one portion (one step procedure), or a part of the urea compound (h) is first charged for deammoniation and, then, the rest of the urea compound (h) is added for further deammoniation (two step procedure). The following are examples of orders of reactions of the polyamine (g), the urea compound (h), the dibasic carboxylic acid compound (i) and the lactam (j) include following. After reacting the polyamine (g) and the dibasic carboxylic acid (i) to carry out a dehydration or dealcoholation reaction, followed by reacting the reaction product with the lactam (j), or after reacting the polyamine (g), dibasic carboxylic acid (i) and the lactam (j) simultaneously to produce a polyamide, the reaction product, i.e. the polyamide thus produced, is reacted with the urea compound (h) to carry out the deammoniation reaction. Alternatively, after reacting a part of the urea compound (h) and the polyamine (g) to carry out out a deammoniation reaction, the reaction product is reacted with the dibasic carboxylic acid compound (i) and the lactam (j), in any particular order or simultaneously, to carry out a dehydration or dealcoholation and a ring-opening addition, followed by a condensation reaction with the remainder of the urea compound (h) to carry out a deammoniation reaction. Further, after completing the reaction of the polyamine (g), the dibasic carboxylic acid compound (i) and the lactam (j) in the presence of a part of the urea compound (h) to carry out a dehydration or dealcoholation, deammoniation and ring-opening addition, the reaction product is reacted with the remainder of the urea compound (h) to carry out a deammoniation reaction. As yet another alternative, after completing the reaction of the polyamine (g) and the dibasic carboxylic acid compound (i) in the presence of a portion of the urea compound (h) for carrying out a dehydration or dealcoholation and deammoniation reaction, the reaction product is reacted with the lactam (j) to carry out a ring-opening addition, followed by the reaction of the remainder of the urea compound (h) to carry out a deammoniation reaction.

The dehydration or dealcoholation is carried out usually at a temperature of about 120° to about 200° C., preferably about 130° to about 180° C., for about 2 to about 10 hours, while removing the generated water or alcohol from the system. The deammoniation is carried out usually at a temperature of about 80° to about 180° C., preferably about 90° to about 160° C., for about 1 to about 18 hours, while removing the generated ammonia outside the system. When the polyamine (g), the urea compound (h) and the dibasic carboxylic acid compound (i) are reacted concurrently, the reaction is usually carried out at a temperature of about 80° to about 200° C., preferably about 90° to about 160° C., for about 2 to about 18 hours, while removing the generated water or alcohol and ammonia from the system. The reaction of lactam (j) with the reaction product of the other members is usually carried out at a temperature of about 120° to about 200° C., preferably about 130° to about 180° C., for about 1 to about 15 hours, preferably for about 5 to about 10 hours.

The reaction of the polyamine (g), the urea compound (h), the dibasic carboxylic acid compound (i) and the lactam (j) gives a polyamidopolyurea, which is then subjected to the reaction with the cross-linking compound (k). When epihalohydrins or $\alpha,\gamma$-dihalo-$\beta$-hydrins are used as the cross-linking compound (k), the cross-linking reaction is generally carried out in an aqueous solution having a reactant concentration of about 10–80% by weight, relative to the total amount of all reactants and the reaction solvent, neutral or alkaline conditions such as, for example, at a pH of about 7 or more, but preferably at about a pH 8 to 12, at a temperature of about 30° to about 90° C. for about 1–10 hours. When glycidyl compounds or isocyanates are used as the cross-linking compound (k), the cross-linking reaction is generally carried out in an aqueous solution having a reactant concentration of about 10–80% by weight, relative to the total amounts of all reactants and the reaction solvent, at a temperature of about 30° to about 100° C., preferably about 40° to about 90° C. for about 1 to about 10 hours, preferably about 3 to about 8 hours. When two or more kinds of the cross-linking compounds (k) are used, these may be reacted either concurrently or separately. When the compounds are separately reacted, it is preferred that each of the reactions is carried out under the above described conditions.

When the optional alicyclic compound (1) is added to the reaction, it can be introduced at any particular step, e.g. allowed to enter into a reaction at any reaction step. For example, the alicyclic compound (1) may be added in any step of the condensation reaction of the four members: the polyamine (g), the urea compound (h), the dibasic carboxylic acid compound (i) and the lactam (j), and allowed to react therewith. Alternatively, the alicyclic compound (1) may be added after the forming the polyamidopolyurea by the condensation reaction of the polyamine (g), the urea compound (h), the dibasic carboxylic acid compound (i) and the lactam (j), but before the reaction of cross-linking compound (k). Further, the alicyclic compound (1) may be added during the reaction of the polyamidopolyurea with the cross-linking compound (k). When the alicyclic compound (1) is the alicyclic amine, the alicyclic amine may be condensed with a portion of the urea compound (h) and then the reaction product may first be reacted with the polyamine (g), the remainder of the urea compound (h), the dibasic carboxylic acid compound (i) and the lactam (j). The deammoniation condensation reaction of the urea compound (h) with the alicyclic amine compound is carried out usually at a temperature of about 80° to about 180° C., preferably about 90° to about 160° C., for about 2 to about 18 hours, while removing the generated ammonia from the reaction system. Alternatively, when the alicyclic compound (1) is an alicyclic epoxy compound, the alicyclic epoxy compound can, if desired, be first subjected to an addition reaction with the polyamine (g), and then the reaction product may be allowed to a react with the dibasic carboxylic acid compound (i) and the lactam (j), and further with the urea compound (h). The addition reaction of the polyamine (g) with the alicyclic epoxy compound is usually carried out at a temperature of about 30° to about 100° C., preferably at about 40° to about 90° C., for about 1 to about 10 hours.

The water soluble resin (A) and water soluble resin (B) obtained in this manner is useful for paper coating. The water soluble resin (A) and water soluble resin (B) can be used as is, or they can be used in the form of a mixture or a reaction product with an amide compound (C).

The amide compound (C) can be obtained by reacting an $\alpha,\beta$-unsaturated carboxylic acid compound (x) with an amine (y). The $\alpha,\beta$-unsaturated carboxylic acid compound (x) can either be in the form of a free acid or in the form of an ester or acid anhydride. Specific examples of the $\alpha,\beta$-unsaturated carboxylic acid compound (x) include (meth) acrylic acid, methyl(meth) acrylate, ethyl(meth)acrylate, butyl(meth)acrylate, itaconic acid, itaconic anhydride, crotonic acid and methyl crotonate.

The amine (y) has a primary or secondary amino group in the molecule. Amines having 4 or more carbon atoms are preferred. Those having 4 or more carbon atoms and two amino groups in the molecule are particularly preferred. When the amine (y) has two amino groups, at least one of the amino groups is primary or secondary amino. The amino compound may have tertiary amino group(s). Amine (y) includes, for instance, the compounds suitable as a polyamine (a) and the alicyclic amine in the alicyclic compound (e). The specific suitable examples of the amine (y) further include, for instance, monoamines such as butylamine, pentylamine, hexylamine, heptylamine, 2-ethylhexylamine, octylamine, benzylamine, diisopropylamine and N-methyl-benzylamine; diamines such as N-ethyl-ethylenediamine, N,N-dimethyl-1,3propanediamine, N-methyl-hexamethylenediamine, 2,4,4-trimethyl-hexamethylenediamine and xylylenediamine; and polyamines such as N-ethyl-iminobisethylamine, N-methyl-iminobispropylamine and N,N-dimethylaminoethylethylenedlamlne.

The amide compound (C) can be obtained by reacting the $\alpha,\beta$-unsaturated carboxylic acid compound (x) with the amine (y) at a temperature which is usually about 100° to about 250° C., preferably at about 130° to about 200° C., for about 2 to about 20 hours, while removing the generated water or alcohol and ammonia from the system. Another preferred method is to carry out the reaction of the both compounds at a temperature which is usually about 10° to about 80° C. for about 1 to about 5 hours, then to to raise the temperature (heating) to about 100° to about 250° C., followed by carrying out the reaction further at that temperature for about 2 to about 15 hours while removing the distillate. In this reaction, an acid catalyst such as, an inorganic polyhydric acid, for instance, sulfuric acid or phosphoric acid, may be used. By preference, the molar amount of the $\alpha,\beta$-unsaturated carboxylic acid compound (x) is within a range of about 0.2 to about 0.5 times the molar quantity of the total of primary and secondary amino groups in the amine (y). It is preferred that about 70% by weight aqueous solution of the amide compound (C) has a viscosity of 1–1,000 Pas, particularly preferably of 5–500 Pas, at 25° C.

When the amide compound (C) is converted to a reaction product with the water soluble resin (A) or with the water soluble resin (B), the reaction is usually carried out at a temperature of about 20° to about 100° C. for about 1 to about 10 hours.

When the compound (f) selected from epihalohydrins and α,γ-dihalo-β-hydrins is used in the production of water soluble resin (A) and the water soluble resin (A) is converted to a reaction product with the amide compound (C), the reaction of the compound (f) may be terminated before the reaction with the amide compound (C). Alternatively the reaction of all or a part of the compound (f) may be carried out while the reaction with the amide compound (C) is carried out. That is, the water soluble resin (A) having the compound (f) as the component may be formed within the reaction system with the amide compound (C). In this case, the reaction may be carried out at least among the polyamine (a), the urea compound (b) and the cross-linking compound (c) without the compound (f) or with only a part of the necessary amount thereof, and then the reaction may be continued in the reaction system supplied with the amide compound (C) and the rest of the compound (f).

When an epihalohydrin or α,γ-dihalo-β-hydrin is used as a cross-linking compound (k) in the production of water soluble resin (B) and the water soluble resin (B) is converted to a reaction product with the amide compound (C), the reaction of the at least one epihalohydrin or α,γ-dihalo-β-hydrin may be terminated before the reaction with the amide compound (C). Alternatively, the reaction of all or a part of the epihalohydrins or α,γ-dihalo-β-hydrins may be carried out while the reaction with the amide compound (C) is carried out. That is the water soluble resin (B) may be formed within the reaction system with the amide compound (C). In this case, the reaction may be carried out at least among the polyamine (g), the urea compound (h), the dibasic carboxylic acid compound (i) and the lactam (j) without the epihalohydrins or α,γ-dihalo-β-hydrins or with only a part of the necessary amount thereof, and then the reaction may be continued in the reaction system supplied with the amide compound (C) and the rest of the epihalohydrins or α,γ-dihalo-β-hydrins.

A paper-coating composition can be prepared by combining the water soluble resin (A) or water soluble resin (B) with a pigment and an aqueous binder. The combining is usually accomplished with mixing the constituents of the composition to obtain a sufficiently homogeneous composition. In principle, any pigment suitable for use in preparing paper coatings, can be used herein. Suitable pigments include, for instance, white inorganic pigments and white organic pigments. White inorganic pigments include, among others, kaolin, talc, calcium carbonate (heavy or light), aluminum hydroxide, satin white and titanium oxide. White organic pigments include, among others, polystyrene, melamine-formaldehyde resin and urea-formaldehyde resin. These pigments can be used independently of one another or as a combination of two or more pigments. Further, color pigments can also be used singly or together with any of the above pigments.

In principle, any aqueous binder suitable for general paper coating application can be used. These suitable binders include water soluble binders and aqueous emulsion binders. Suitable water soluble binders include unmodified or modified starches such as oxidized starch and starch phosphate, polyvinyl alcohol, water soluble proteins such as casein and gelatin and modified cellulose such as carboxymethyl cellulose. Suitable aqueous emulsion binders include styrene-butadiene resin, vinyl acetate resin, ethylene-vinyl acetate resin and methyl methacrylate resin. The aqueous binders can be used independently of one another, e.g. single, or as a combination of any two or more suitable aqueous binders.

The ratio of the pigment to the aqueous binder depends on the ultimate utility and object of the resultant paper coating composition. However, the ratio is not particularly restricted. In an example of the composition, the amount of the aqueous binder is preferably about 5 to about 200 parts by weight, more preferably about 10 to about 50 parts by weight, based on 100 parts by weight of the pigment.

The amount of a resin component consisting of the water soluble resin (A) alone or as a mixture with or as a reaction product of the water soluble resin (A) and any other compound(s), such as the amide compound (C), is preferably about 0.05 to about 5 parts by weight, more preferably about 0.1 to about 2 parts by weight in solid basis based on 100 parts by weight of pigment. By preference the amide compound (C) in the mixture or as the reaction product of the water soluble resin (A) and the amide compound (C) as the resin component is within a range of about 1 to about 90% by weight, particularly of about 3 to about 80% by weight, based on the weight of the resin component in solid basis.

The amount of a resin component consisting of the water soluble resin (B) alone or as a mixture or reaction product of the water soluble resin (B) and any other compound(s), such as the amide compound (C), is preferably about 0.05 to about 5 parts by weight, more preferably about 0.1 to about 2 parts by weight in solid basis based on 100 parts by weight of the pigment. A preferred amount of the amide compound (C) in the mixture or in the reaction product of the water soluble resin (B) and the amide compound (C) as the resin component, is within a range of about 1 to about 90% by weight, particularly of about 3 to about 80% by weight, based on the weight of the resin component in solid basis.

In the preparation of the paper coating composition, the order of adding and mixing the pigment, the aqueous binder and the resin component is not critical and thus is not particularly limited. A diverse mixing scheme can be applied. For instance, when the resin component consists of the water soluble resin (A) alone or consists of the water soluble resin (B) alone, the water soluble resin may be added and mixed with a mixture of the pigment and the aqueous binder, or the water soluble resin can be added and mixed beforehand to an aqueous slurry of the pigment or the aqueous binder and then the rest of component be combined. When the resin component is a mixture of the water soluble resin (A) or water soluble resin (B) and the amide compound (C), the water soluble resin and the amide compound (C) may be mixed beforehand and then the pigment and the aqueous binder be combined, or the water soluble resin (A) or water soluble resin (B) and the amide compound (C) may be added and mixed independently of one another to a mixture of the pigment and the aqueous binder. Alternatively, a paper coating composition can be prepared by adding and mixing one or both of the water soluble resin (A) or water soluble resin (B) and the amide compound (C) to the pigment or the aqueous binder, and the rest of component is mixed. Further, when the resin component is a reaction product of the water soluble resin (A) or water soluble resin (B) and the amide compound (C), the reaction product may be added and mixed to a mixture of the pigment and the aqueous binder, or the reaction product may be added and mixed beforehand to an aqueous slurry of the pigment or the aqueous binder and then the rest of component be combined.

The paper coating composition of the present invention can further contain one or more other components such as, for instance, dispersants, viscosity/flowability modifiers, antifoaming agents, preservatives, lubricants, water retention agents and colorants e.g., dyes, color pigments or the like.

The paper coating composition of the present invention can be applied to a paper by various means available to those skilled in the art. Suitable methods include using coaters, such as a blade coater, air knife coater, bar coater, size press coater gate roll coater and cast coater. Thereafter, the paper is subjected to the necessary drying step and, if necessary, smoothing step using a supercalender or the like to finish a coated paper.

The water soluble resin according to the present invention is particularly useful for paper coating. In particular, this resin is formaldehyde-free and therefore, does not release formaldehyde, e.g., no aldehyde emissions, when used in paper coating operations, nor from the coated paper. Further, the paper coating composition prepared using this water soluble resin can impart improved properties to coated papers, including excellent ink acceptability and water resistance. Thus, the present invention also includes these coated papers wherein the coating is formed from the water soluble resin in combination with the at least one specified amide compound.

Coated papers, paper coating methods, and paper coating compositions, including components thereof, described in Japanese Application No. 08-09067 filed Apr. 12, 1996 and Japanese Application No. 08-098057 filed Apr. 19, 1996, the complete disclosures of which are incorporated herein by reference.

As used herein, the term "paper" includes paper broadly, as well as card board in the narrow sense. Suitable suitable paper, including card board, on which the present coating composition can be effectively applied is available to those skilled in the art.

EXAMPLES

The present invention will now be described in more detail by the following non-limiting Examples. Unless otherwise stated, % and part used for indicating content or amount are on a weight basis in the following Examples. Viscosity and pH were measured at 25° C.

Synthetic Example 1

In to a four-necked flask equipped with a thermometer, a reflux condenser and a stirrer were charged 103.2 g (1 mole) of diethylenetriamine and 73.1 g (0.5 mole) of adipic acid and they were heated to an inner temperature of 140°–160° C. for 5 hours to effect on dehydrating amidation reaction. The inner temperature was then lowered to 80° C. and 96.1 g (1.6 mole) of urea was charged thereto. The mixture was diluted by addition of 63.6 g of water to adjust the nonvolatile matter content to 80% and then heated to an inner temperature of 90°–110° C. for 12 hours to effect deammoniation reaction. Thereafter, the inner temperature was lowered to 40° C., 44.4 g (0.2 mole) of resorcin diglycidyl ether and 117 g of water were charged and the mixture was heated to an inner temperature of 70° C. for 4 hours for carrying out the reaction. Thereafter, pH and concentration of the mixture were adjusted with sulfuric acid and water to give 472.5 g of an aqueous solution of a water soluble resin having a concentration of 60%, pH of 7.0 and a viscosity of 290 cP.

Synthetic Example 2

After carrying out the dehydrating amidation reaction and deammoniation reaction according to manners similar to those in Synthetic Example 1, the inner temperature was lowered to 40° C., 35.5 g (0.16 mole) of resorcin diglycidyl ether and 111.5 g of water were charged and the mixture was heated to an inner temperature of 70° C. for 4 hours for carrying out the reaction. Then, keeping the inner temperature at 70° C., 3.7 g (0.04 mole) of epichlorohydrin and 2.5 g of water were charged and the mixture was heated to an inner temperature of 70° C. for 4 hours for carrying out the reaction. After the reaction was completed, pH and concentration of the mixture were adjusted with sulfuric acid and water to give 466.3 g of an aqueous solution of a water soluble resin having a concentration of 60%, pH of 7.0 and a viscosity of 230 cP.

Synthetic Example 3

Into a vessel similar to that used in Synthetic Example 1, 82.5 g (0.8 mole) of diethylenetriamine and 29.2 g (0.2 mole) of triethylenetetramine were charged and 67 g of water was added. After heating the mixture to an inner temperature of 80° C., 156.2 g (2.6 mole) of urea was then charged and the mixture was kept at an inner temperature of 90°–110° C. for 12 hours to effect a deammoniation reaction. Then, the inner temperature was lowered to 40° C., 9.3 g (0.1 mole) of epichlorohydrin, 43.3 g (0.2 mole) of neopentyl glycol diglycidyl ether and 117.1 g of water were charged and the mixture was heated to an inner temperature of 70° C. for 4 hours for carrying out the reaction. Thereafter, the pH and concentration of the mixture were adjusted with sulfuric acid and water to give 485.4 g of an aqueous solution of a water soluble resin having a concentration of 60%, pH of 7.1 and a viscosity of 180 cP.

Synthetic Example 4

Into a vessel similar to that used in Synthetic Example 1, 146.2 g (1 mole) of triethylenetetramine and 52.8 g (0.4 mole) of glutaric acid were charged and they were heated to an inner temperature of 140°–160° C. for 3 hours to effect a dehydrating amidation reaction. Then, the inner temperature was lowered to 80° C. and 144.2 g (2.4 mole) of urea was charged. The mixture was diluted by addition of 82.2 g of water to adjust the nonvolatile matter content to 80% and heated to an inner temperature of 90°–110° C. for 12 hours to effect deammoniation reaction. Then, the inner temperature was lowered to 70° C., 67.3 g (0.4 mole) of hexamethylene diisocyanate and 154.6 g of water were charged and the mixture was heated to an inner temperature of 70° C. for 8 hours for carrying out the reaction. Thereafter, the pH and concentration of the mixture were adjusted with sulfuric acid and water to give 618.9 g of an aqueous solution of a water soluble resin having a concentration of 60%, pH of 7.2 and a viscosity of 580 cP.

Synthetic Example 5

Into a vessel similar to that used in Synthetic Example 1, 113.6 g (0.6 mole) of tetraethylenepentamine and 12.0 g (0.2 mole) of urea were charged and they were heated to an inner temperature of 90°–150° C. for 5 hours to effect the deammoniation reaction. The inner temperature was then lowered to 80° C. and 108.1 g (1.8 mole) of urea was charged. The mixture was diluted by addition of 56.7 g of water to adjust the nonvolatile matter content to 80% and heated to an inner temperature of 90°–110° C. for 12 hours to effect deammoniation reaction. The inner temperature was then lowered to 70° C., 72.0 g (0.2 mole) of pentaerythritol tetraglycidyl ether and 159.9 g of water were charged and the mixture was heated to an inner temperature of 70° C. for 8 hours for carrying out the reaction. Thereafter, pH and concentration of the mixture were adjusted with sulfuric acid and water to give 469.4 g of an aqueous solution of a water soluble resin having a concentration of 60%, pH of 6.9 and a viscosity of 330 cP.

Synthetic Example 6

Into a vessel similar to that used in Synthetic Example 1, 65.6 g (0.5 mole) of iminobispropylamine and 5.0 g (0.05 mole) of cyclohexylamine were charged and further 14.8 g (0.1 mole) of phthalic anhydride was added thereto. The contents of the vessel were heated to an inner vessel temperature of 150°–170° C. for 5 hours to effect a dehydrating amidation reaction. The inner temperature was then lowered to 80° C. and 63.1 g (1.05 mole) of urea was charged. The mixture was diluted by addition of 36.7 g of water to adjust the nonvolatile matter content to 80% and heated to an inner temperature of 90°–110° C. for 12 hours to effect deammoniation reaction. Then, the inner temperature was lowered to 40° C., 2.8 g (0.03 mole) of epichlorohydrin, 41.8 g (0.24 mole) of ethylene glycol diglycidyl ether and 78.9 g of water were charged and the mixture was heated to an inner temperature of 70° C. for 4 hours for carrying out the reaction. Thereafter, the pH and concentration of the mixture were adjusted with sulfuric acid and water to give 301.3 g of an aqueous solution of a water soluble resin having a concentration of 60%, pH of 7.0 and a viscosity of 190 cP.

Synthetic Example 7

Into a vessel similar to that used in Synthetic Example 1, 105.0 g (0.8 mole) of iminobispropylamine, 5.3 g (0.04 mole) of glutaric acid and 46.8 g (0.32 mole) of adipic acid were charged, and they were heated to an inner temperature of 150°–170° C. for 5 hours to effect a dehydrating amidation reaction. The inner vessel temperature was then lowered to 80° C. and 61.3 g (1.02 mole) of urea was charged. The mixture was diluted by addition of 51.4 g of water to adjust the nonvolatile matter content to 80% and heated to an inner temperature of 90°–110° C. for 12 hours to effect a deammoniation reaction. The inner temperature was then lowered to 70° C., 2.0 g (0.02 mole) of cyclohexene oxide and 75.5 g of water were charged and the mixture was heated to an inner temperature of 80°–90° C. for 6 hours for carrying out the reaction. After lowering the inner temperature to 30° C., 111.5 g (0.64 mole) of ethylene glycol diglycidyl ether and 74.3 g of water were charged and the mixture was heated to an inner temperature of 70°–90° C. for 4 hours for carrying out the reaction. After the reaction was completed, pH and concentration of the mixture were adjusted with sulfuric acid and water to give 531.1 g of an aqueous solution of a water soluble resin having a concentration of 60%, pH of 7.0 and a viscosity of 170 cP.

Synthetic Example 8

Into a four-necked flask equipped with a thermometer, a reflux condenser and a stirrer were charged 232.4 g (1 mole) of pentaethylenehexamine and 73.1 g (0.5 mole) of adipic acid and they were heated to an inner temperature of 140°–160° C. for 5 hours to effect dehydrating amidation reaction while removing the generated water outside the system. Then, the inner temperature was lowered to 120° C. and 6.8 g (0.06 mole) of ε-caprolactam was charged and the mixture was heated to an inner temperature of 140°–160° C. for 5 hours to effect a ring-opening addition reaction. Then, 264.3 g (4.4 mole) of urea and 139.6 g of water were charged and then the mixture was heated to an inner vessel temperature of 90° C. to 110° C. for 12 hours to effect a deammoniation reaction. Thereafter, the inner vessel temperature was lowered to 40° C., 27.8 g (0.3 mole) of epichlorohydrin and 201.4 g of water were charged and the mixture in the vessel was heated to an inner vessel temperature of 70° C. for 4 hours to carry out the reaction. Thereafter, the pH and concentration of the mixture were adjusted with sulfuric acid and water to give 861.9 g of an aqueous solution of a water soluble resin having a concentration of 60%, pH of 7.0 and a viscosity of 250 c P.

Synthetic Example 9

Into a vessel similar to that used in Synthetic Example 8, 92.9 g (0.4 mole) of pentaethylenehexamine and 43.8 g (0.3 mole) of adipic acid were charged. Keeping the inner temperature at 140°–160° C., the dehydrating amidation reaction was carried out for 5 hours while removing the generated water outside the system. Then, the inner temperature was lowered to 120° C. and 5.7 g (0.05 mole) of ε-caprolactam was charged and the mixture was heated to an inner temperature of 140°–160° C. for 5 hours to effect a ring-opening addition reaction. Then, 78.1 g (1.3 mole) of urea and 52.4 g of water were charged and the mixture was then heated to an inner temperature of 90°–110° C. for 12 hours to effect a deammoniation reaction. Thereafter, the inner temperature was lowered to 40° C., 27.8 g (0.3 mole) of epichlorohydrin, 44.4 g (0.2 mole) of resorcin diglycidyl ether and 120.8 g of water were charged and the mixture was heated to an inner temperature of 70° C. for 4 hours to carrying out the reaction. Thereafter, the pH and concentration of the mixture were adjusted with sulfuric acid and water to give 452.4 g of an aqueous solution of a water soluble resin having a concentration of 60%, pH of 7.0 and a viscosity of 760 cP.

Synthetic Example 10

Into a vessel similar to that used in Synthetic Example 8, 139.4 g (0.6 mole) of pentaethylenehexamine and 43.8 g (0.3 mole) of adipic acid were charged. The inner vessel temperature was kept at 140°–160° C., and the dehydrating amidation reaction was carried out for 5 hours while removing the generated water from the system. Then, the inner temperature was lowered to 120° C. and 4.1 g (0.036 mole) of ε-caprolactam was charged and the mixture was heated to an inner vessel temperature of 140°–160° C. for 5 hours to effect a ring-opening addition reaction. Then, 144.2 g (2.4 mole) of urea and 80.2 g of water were charged and then the mixture was heated to an inner temperature of 90°–110° C. for 12 hours to effect a deammoniation reaction. Thereafter, the inner temperature was lowered to 40° C., 66.7 g (0.3 mole) of resorcin diglycidyl ether and 150.8 g of water were charged and the mixture was heated to an inner temperature of 70° C. for 4 hours to carry out the reaction. Thereafter, the pH and concentration of the mixture were adjusted with sulfuric acid and water to give 599.1 g of an aqueous solution of a water soluble resin having a concentration of 60%, pH of 7.0 and a viscosity of 340 cP.

Synthetic Example 11

Into a vessel similar to that used in Synthetic Example 8, 75.7 g (0.4 mole) of tetraethylenepentamine, 9.9 g (0.1 mole) of cyclohexylamine and 41.5 g (0.25 mole) of isophthalic acid were charged. Keeping the inner temperature at 140°–160° C., the dehydrating amidation reaction was carried out for 5 hours while removing the generated water from the system. Then, the inner temperature was lowered to 80° C. and 5.7 g (0.05 mole) of ε-caprolactam and 6 g (0.1 mole) of urea were charged at the same time and the mixture was heated to an inner temperature of 140°–160° C. for 5 hours to effect concurrently a ring-opening addition reaction and deammoniation reaction. Then, 66.1 g (1.1 mole) of urea and 49.0 g of water were charged and then the mixture was heated to an inner temperature of 90°–110° C. for 12 hours to effect a deammoniation reaction. Thereafter, the inner vessel temperature was lowered to 40° C., 26.1 g (0.15 mole) of ethyleneglycol diglycidyl ether and 84.3 g of water were charged and the mixture was heated to an inner temperature of 70° C. for 4 hours to carrying out the reaction. Thereafter, the pH and concentration of the mixture were adjusted with sulfuric acid and water to give 355.3 g of an aqueous solution of a water soluble resin having a concentration of 60%, pH of 7.0 and a viscosity of 580 cP.

Synthetic Example 12

Into a vessel similar to that used in synthetic Example 8, 117 g (0.8 mole) of triethylenetetramine and 44.4 g (0.3 mole) of phthalic anhydride were charged. Keeping the inner temperature at 140°–160° C., the dehydrating amidation reaction was carried out for 5 hours while removing the generated water outside the system. Then, the inner temperature was lowered to 120° C. and 7.9 g (0.04 mole) of lauryllactam was charged and the mixture was heated to an inner vessel temperature of 140°–160° C. for 5 hours to effect a ring-opening addition reaction. Then, 120.1 g (2 mole) of urea and 71 g of water were charged and then the mixture was heated to an inner temperature of 90°–110° C. for 12 hours to effect a deammoniation reaction. Thereafter, the inner temperature was lowered to 40° C., 50.5 g (0.3 mole) of hexamethylenediisocyanate and 129.3 g of water were charged and the mixture was heated to an inner temperature of 70° C. for 4 hours to carrying out the reaction. Thereafter, the pH and concentration of the mixture were adjusted with sulfuric acid and water to give 355.3 g of an aqueous solution of a water soluble resin having a concentration of 60%, pH of 7.0 and a viscosity of 490 cP.

Then, Examples for syntheses of the amide compound (C) are now shown.

Synthetic Example 13

Into a four-necked flask equipped with a thermometer, a Liebig's condenser, a dropping funnel and a stirrer was charged 232 g (2 moles) of hexamethylenediamine. Keeping the inner temperature at 40°–50° C., 150 g (1.5 mole) of methyl methacrylate was added dropwise over an hour and the mixture was heated to 60°–70° C. for an hour. Then, the inner temperature was elevated to 120°–150° C. and the reaction was continued for 5 hours at that temperature while distilling out methanol. After the reaction was completed, water was added to give 477.1 g of an aqueous solution of anamide compound having a concentration of 70% and viscosity of 74 P.

Synthetic Example 14

Into a vessel similar to that used in Synthetic Example 13, 204 g (2 moles) of N,N-dimethyl-1,3-propanediamine was charged and further 86 g (1 mole) of methyl acrylate was charged. Keeping the inner temperature at 100°–130° C., the reaction was effected for 5 hours while distilling out methanol. After the reaction was completed, water was added to give 368.5 g of an aqueous solution of an amide compound having a concentration of 70% and viscosity of 7.3 P.

Synthetic Example 15

Into a vessel similar to that used in Synthetic Example 13 was charged 170.3 g (1 mole) of isophoronediamine. Keeping the temperature in the system at 60°–80° C., 45.0 g (0.5 mole) of 80% aqueous solution of acrylic acid was added dropwise and the mixture was kept at 60°–80° C. for an additional hour. Then, the mixture was heated to an inner temperature of 140°–160° C. for 5 hours to effect dehydrating amidating reaction. After the reaction was completed, water was added to give 281.9 g of an aqueous solution of an amide compound having a concentration of 70% and viscosity of 54.3 P.

Synthetic Example 16

Into a vessel similar to that used in Synthetic Example 13 was charged 198.36 g (2 moles) of cyclohexylamine. Keeping the inner temperature at 60°–80° C., 86.09 g (1 mole) of methyl acrylate was added dropwise and the mixture was kept at 60°–80° C. for an hour. Keeping the inner temperature at 140°– 160° C., the reaction was effected for 5 hours at that temperature while distilling out methanol. After the reaction was completed, water was added to give 360.6 g of a suspension of an amide composition having a concentration of 70%.

Synthetic Example 17

Into a vessel similar to that used in Synthetic Example 13 was charged 60.1 g (1 mole) of ethylenediamine. Keeping the temperature in the system at 60°–80° C., 45.0 g (0.5 mole) of 80% aqueous solution of acrylic acid was added dropwise and the mixture was kept at 60°–80° C. for an additional hour. Then, the mixture was heated to an inner temperature of 140°–160° C. for 5 hours to effect reaction while distilling out water. After the reaction was completed, water was added to give 124.4 g of an aqueous solution of an amide compound having a concentration of 70% and viscosity of 5.1 P.

Synthetic Example 18

Into a vessel similar to that used in Synthetic Example 13 was charged 172.3 g (1 mole) of 1,10-diaminodecane. The inner vessel temperature was kept at 60°–80° C., 45.0 g (0.5 mole) of 80% aqueous solution of acrylic acid was added dropwise and the mixture was kept at 60°–80° C. for an additional hour. Then, the mixture was heated to an inner temperature of 140°–160° C. for 5 hours to effect reaction while distilling out water. After the reaction was completed, water was added to give 284.7 g of an aqueous solution of an amide compound having a concentration of 70% and viscosity of 50.5 P.

Further, Examples for syntheses of the reaction products of the water soluble resin (A) with the amide compound (C) are now shown.

Synthetic Example 19

Into a four-necked flask equipped with a thermometer, a reflux condenser and a stirrer were charged 236.3 g of a resin solution having a concentration of about 60% and prepared in a manner similar to that in Synthetic Example, 1 but before the pH adjustment, 21.6 g of 70% aqueous solution of the amide compound obtained in Synthetic Example 15 and 3.6 g of water were charged, and these reactants were allowed to react at 60°–70° C. for 2 hours. Then, the pH and concentration of the mixture were adjusted with sulfuric acid and water to give an aqueous solution of resin component having a concentration of 60%, pH of 6.9 and a viscosity of 340 cP.

Synthetic Example 20

Into a vessel similar to that used in Synthetic Example 19 were charged 236.3 g of a resin solution having a concentration of about 60% and prepared in a manner similar to that in Synthetic Example 1 but before the pH adjustment, 21.6 g of 70% aqueous solution of the amide compound obtained in Synthetic Example 15, 6.4 g of epichlorohydrin and 7.9 g of water were charged, and then these reactants were reacted at 60°–70° C. for 4 hours. Then, the pH and concentration of the mixture were adjusted with sulfuric acid and water to give an aqueous solution of resin component having a concentration of 60%, pH of 7.0 and a viscosity of 400 cP.

Synthetic Example 21

Into a vessel similar to that used in Synthetic Example 19 were charged 185.7 g of a resin solution having a concentration of about 60% and prepared in a manner similar to that in Synthetic Example 4, but before the pH adjustment, 16.9 g of 70% aqueous solution of the amide compound obtained in Synthetic Example 17 and 2.7 g of water were charged. These combined materials (reactants) were allowed to react at 60°–70° C. for 2 hours. Then, the pH and concentration of the mixture were adjusted with sulfuric acid and water to give an aqueous solution or resin component having a concentration of 60%, pH of 7.1 and a viscosity of 670 cP.

Synthetic Example 22

Into a vessel similar to that used in Synthetic Example 19 were charged 241 g of a resin solution having a concentration of about 60% and prepared in a manner similar to that in Synthetic Example 6, but before the pH adjustment, 22.0 g of 70% aqueous solution of the amide compound obtained in Synthetic Example 14 and 3.7 g of water were charged. The combined materials were allowed to react at 60°–70° C. for 2 hours. Then, the pH and concentration of the mixture were adjusted with sulfuric acid and water to give an aqueous solution of resin component having a concentration of 60%, pH of 7.0 and a viscosity of 240 cP.

Synthetic Example 23

Into a four-necked flask equipped with a thermometer, a reflux condenser and a stirrer were charged 170.5 g of a resin solution having a concentration of about 60% and prepared in a manner similar to that in Synthetic Example 8 but, before the pH adjustment, 16.2 g of 70% aqueous solution of the amide compound obtained in Synthetic Example 15 and 2.8 g of water were charged to the vessel. The combined materials were allowed to react at 60°–70° C. for 2 hours. Then, the pH and concentration of the mixture were adjusted with sulfuric acid and water to give an aqueous solution of resin component having a concentration of 60%, pH of 7.0 and a viscosity of 300 cP.

Synthetic Example 24

Into a vessel similar to that used in Synthetic Example 23 were charged 170.5 g of a resin solution having a concentration of about 60% and prepared in a manner similar to that in Synthetic Example 8 but, before the pH adjustment, 36.5 g of 70% aqueous solution of the amide compound obtained in Synthetic Example 15 and 6.2 g of water were charged to the vessel. The charged, e.g., combined materials were allowed to react at 60°–70° C. for 2 hours. Then, the pH and concentration of the mixture were adjusted with sulfuric acid and water to give an aqueous solution of resin component having a concentration of 60%, pH of 6.9 and a viscosity of 340 cP.

Synthetic Example 25

Into a vessel similar to that used in Synthetic Example 23 were charged 170.5 g of a resin solution having a concentration of about 60% and prepared in a manner similar to that in Synthetic Example 8 but, before the pH adjustment, 16.2 g of 70% aqueous solution of the amide compound obtained in Synthetic Example 15, 1.9 g of epichlorohydrin and 4.1 g of water were charged to the vessel. They were reacted at 60°–70° C. for 4 hours. Then, the pH and concentration of the mixture were adjusted with sulfuric acid and water to give an aqueous solution of resin component having a concentration of 60%, pH of 7.0 and a viscosity of 380 cP.

Synthetic Example 26

Into a vessel similar to that used in Synthetic Example 23 were charged 192.5 g of a resin solution having a concentration of about 60% and prepared in a manner similar to that in Synthetic Example 10 but, before the pH adjustment, 18.3 g of 70% aqueous solution of the-amide compound obtained in Synthetic Example 13 and 3.0 g of water were charged to the vessel. The charged materials allowed to react were at 60°–70° C. for 2 hours. Then, the pH and concentration of the mixture were adjusted with sulfuric acid and water to give an aqueous solution of resin component having a concentration of 60%, pH of 7.0 and a viscosity of 400 cP.

Synthetic Example 27

Into a vessel similar to that used in Synthetic Example 23 were charged 144.4 g of a resin solution having a concentration of about 60% and prepared in a manner similar to that in Synthetic Example 10 but, before the pH adjustment, 13.8 g of 70% aqueous solution of the amide compound obtained in Synthetic Example 18 and 2.1 g of water were charged to the vessel. They were reacted at 60°–70° C. for 2 hours. Then, the pH and concentration of the mixture were adjusted with sulfuric acid and water to give an aqueous solution of resin component having a concentration of 60%, pH of 7.0 and a viscosity of 410 cP.

Synthetic Example 28

Into a vessel similar to that used in Synthetic Example 23 were charged 125.2 g of a resin solution having a concentration of about 60% and prepared in a manner similar to that in Synthetic Example 12 but, before the pH adjustment, 11.9 g of 70% aqueous solution of the amide compound obtained in Synthetic Example 14 and 1.9 g of water were charged to the vessel. The charged materials were reacted at 60°–70° C. for 2 hours. Then, the pH and concentration of the mixture were adjusted with sulfuric acid and water to give an aqueous solution of resin component having a concentration of 60%, pH of 7.0 and a viscosity of 540 cP.

Paper coating compositions were prepared using the compounds or resins obtained in Synthetic Examples described above and evaluated in the following Examples, in which master colors having compositions shown in Table 1 were used.

TABLE 1

| Composition of Master Colors | | |
|---|---|---|
| Ingredient | Product | Ratio*6 |
| Pigment | Ultrawhite 90*1 | 70 parts |
|  | Carbital 90*2 | 30 parts |
| Dispersant | Sumirez resin ??? DS-10*3 | 0.2 part |
| Aqueous | SN-307*4 | 12 parts |
| Binder | OJI-ACE A*5 | 4 parts |

TABLE 1-continued

Composition of Master Colors

| Ingredient | Product | Ratio*6 |
|---|---|---|

(Footnote for Table 1)
*1Ultrawhite 90: Clay manufactured by Engelhard_Minerals, USA
*2Carbital 90: Calcium carbonate manufactured by Fujikaolin K.K.
*3Sumirez resin DS-10: Polyacrylate pigment dispersant manufactured by Sumitomo Chemical Co., Ltd.
*4SN-307: Styrene-butadiene latex manufactured by Sumika ABS Latex K.K.
*5OJI-ACE A: Oxidized starch manufactured by Oji National K.K.
*6Ratio: Ratio in solid weight

Application Examples 1–12

To the master color shown in Table 1 were added the aqueous solutions of water soluble resin obtained in Synthetic Example 1–12, respectively, such that the solid content was 0.5 part per 100 parts of the pigment in each master color portion (batch). The resulting compositions were respectively adjusted with water and 10% aqueous sodium hydroxide to total solid content of 60% and pH of about 9 to yield the coating compositions. The physical properties of the coating compositions were evaluated according to the methods described below and results are shown in Table 2 and Table 3.

(1) pH

Using a glass electrode hydrogen ion concentration meter (manufactured by Toa Dempa Kogyo K.K.), pH of the coating compositions was measured at 25° C. immediately after the preparation.

(2) Viscosity

Using a type B viscometer (model BL, manufactured by K.K. Tokyo Keiki), viscosity of the coating compositions was measured at 60 rpm and 25° C. immediately after the preparation.

The coating compositions was applied respectively on one side of fine papers having a basis weight of 80 g/cm² with a wire rod to a coating weight of 14 g/cm². Immediately after the coating, the papers were dried in a hot air at 120° C. for 30 seconds, subjected to moisture conditioning at a temperature of 20° C. and relative humidity of 65% for 16 hours and subjected twice to super calender treatment under conditions of a temperature of 60° C. and of a linear pressure of 60 kg/cm to yield coated papers. The water resistance and ink acceptability of the coated papers were evaluated in according to the methods described below. The results are shown in Table 2 and Table 3.

(3) Water Resistance: Wetpick process (WP process)

Using an RI testing machine (manufactured by Akira Seisakusho), the coated side was printed after moistening with a water supplying roll and extent of peeling off was evaluated by visual observation. Scoring system and criteria for evaluation were as follows:

Water resistance: (poor) 1–5 (excellent)

(4) Ink Acceptability (4–1) Process A

Using an RI testing machine, the coated side was printed after moistening with a water supplying roll and ink acceptability was evaluated by visual observation. Scoring system and criteria for evaluation were as follows:

Ink acceptability: (poor) 1–5 (excellent)

(4–2) Process B

Using an RI testing machine, the side was printed while kneading the ink with water and ink acceptability was visual observation. Scoring system and evaluated by criteria for evaluation were as follows:

Ink acceptability: (poor) 1–5 (excellent)

TABLE 2

Test Results in Application Examples 1–7

| Application Example | 1 | 2 | 3 | 4 | 5 | 6 | 7 |
|---|---|---|---|---|---|---|---|
| No. of Synthetic Example for Resin | 1 | 2 | 3 | 4 | 5 | 6 | 7 |
| Properties of Coating Composition | | | | | | | |
| pH | 9.1 | 9.1 | 9.1 | 9.1 | 9.0 | 9.1 | 9.1 |
| Viscosity (cP) | 1330 | 1300 | 1280 | 1480 | 1350 | 1280 | 1270 |
| Properties of Coated Paper | | | | | | | |
| Water Resistance: WP Process | 3.1 | 3.0 | 2.7 | 2.6 | 2.8 | 2.3 | 2.4 |
| Ink Acceptability: Process A | 3.0 | 2.9 | 2.5 | 2.7 | 2.6 | 2.4 | 2.4 |
| Ink Acceptability: Process B | 3.1 | 3.1 | 2.4 | 2.8 | 2.6 | 2.5 | 2.4 |

TABLE 3

Test Results in Application Examples 8–12

| Application Example | 8 | 9 | 10 | 11 | 12 |
|---|---|---|---|---|---|
| No. of Synthetic Example for Resin | 8 | 9 | 10 | 11 | 12 |
| Properties of Coating Composition | | | | | |
| pH | 9.0 | 9.1 | 9.0 | 9.0 | 9.0 |
| Viscosity (cP) | 1320 | 1460 | 1350 | 1410 | 1390 |
| Properties of Coated Paper | | | | | |
| Water Resistance: WP Process | 2.9 | 3.1 | 3.0 | 2.8 | 2.6 |
| Ink Acceptability: Process A | 2.8 | 2.6 | 3.0 | 2.5 | 2.4 |
| Ink Acceptability: Process A | 2.7 | 2.6 | 3.0 | 2.5 | 2.5 |

Application Example 13

The 60% aqueous solution of water soluble resin obtained in Synthetic Example 1 and the 70% aqueous solution of amide compound obtained in Synthetic Example 15 were mixed such that the content of the amide compound converted into solid content is 10% and then the mixture was subjected to a pH and concentration adjustment using water and sulfuric acid to give an aqueous solution of resin component having a concentration of 60%, pH of 7.0 and a viscosity of 320 cP. The aqueous solution of resin component was added to the master color having a composition shown in Table 1 such that the solid content in the aqueous solution of resin component is 0.5 part per 100 parts of the pigment in each said master color batch.

Application Example 14

The 60% aqueous solution or water soluble resin obtained in Synthetic Example 8 and the 70% aqueous solution of amide compound obtained in Synthetic Example 13 were mixed such that the content of the amide compound converted into solid content is 10% and then the mixture was subjected to a pH and concentration adjustment with water and sulfuric acid to give an aqueous solution of resin component having a concentration of 60%, pH of 7.0 and a viscosity of 280 cP. The aqueous solution of resin component was added to the master color having a composition shown in Table 1 such that the solid content in the aqueous solution of resin component is 0.5 part per 100 parts of the pigment in said each master color batch.

Application Examples 15–47

Aqueous solutions of resin component having properties shown in Table 4–7 were prepared in a manner similar to that in Application Example 13 except that the kind and amount of the water soluble resin and amide compounds were changed as shown in Tables 4–7, respectively. These solutions were added to the master color in the same ratio as that in Application Example 13.

The compositions obtained in Application Examples 13–47 were each subjected to a pH and total solid concentration adjustment a manner similar to that in Application Examples 1–12. Respective coating compositions were applied to papers and the coated papers were tested according to the same manner. The results are shown in Tables 4–7. In Tables 4–7, the amounts of the amide compounds are weight ratios of the respective amide compounds based on the total solid in the aqueous solutions of resin component which are mixtures of the water soluble resins and the amide compounds. Said ratios are calculated by the following equation:

Amount of Amide Compound=Weight of Amide Compound÷(Weight of Water Soluble Resin+Weight of Amide Compound)×10.0 (%)

TABLE 4

Test Results in Application Examples 13 and 15–22
(using mixtures of water soluble resins and amide compounds)

| Application Example | 13 | 15 | 16 | 17 | 18 | 19 | 20 | 21 | 22 |
|---|---|---|---|---|---|---|---|---|---|
| No. of Synthetic Example for Water Soluble Resin | 1 | 1 | 1 | 1 | 2 | 2 | 2 | 3 | 3 |
| No. of Synthetic Example for Amide Compound | 15 | 16 | 17 | 17 | 13 | 14 | 18 | 14 | 15 |
| Amount | 10% | 10% | 5% | 20% | 10% | 10% | 30% | 5% | 10% |
| Properties of Aqueous Solution of Resin Component | | | | | | | | | |
| pH | 7.0 | 7.0 | 7.1 | 6.9 | 7.0 | 7.0 | 7.0 | 7.0 | 7.1 |
| Viscosity (cP) | 320 | 320 | 300 | 340 | 270 | 240 | 320 | 190 | 200 |
| Properties of Coating Composition | | | | | | | | | |
| pH | 9.1 | 9.1 | 9.1 | 9.1 | 9.0 | 9.1 | 9.0 | 9.0 | 9.0 |
| Viscosity (cP) | 1350 | 1350 | 1340 | 1400 | 1320 | 1310 | 1420 | 1400 | 1290 |
| Properties of Coated Paper | | | | | | | | | |
| Water Resistance: WP Process | 4.5 | 4.0 | 3.4 | 38 | 4.1 | 3.5 | 4.3 | 2.9 | 3.2 |
| Ink Acceptability: Process A | 4.2 | 3.9 | 3.5 | 38 | 3.9 | 3.7 | 4.4 | 2.9 | 3.3 |
| Ink Acceptability: Process B | 4.3 | 3.8 | 3.4 | 3.9 | 3.9 | 3.6 | 4.5 | 2.9 | 3.2 |

TABLE 5

Test Results in Application Examples 23–31
(using a mixture of a water soluble resin and an amide compound)

| Application Example | 23 | 24 | 25 | 26 | 27 | 28 | 29 | 30 | 31 |
|---|---|---|---|---|---|---|---|---|---|
| No. of Synthetic Example for Water Soluble Resin | 4 | 4 | 4 | 5 | 5 | 6 | 6 | 7 | 7 |
| No. of Synthetic Example for Amide Compound | 13 | 15 | 16 | 14 | 16 | 17 | 18 | 13 | 17 |
| Amount | 10% | 10% | 20% | 5% | 10% | 40% | 10% | 10% | 10% |
| Properties of Aqueous Solution of Resin Component | | | | | | | | | |
| pH | 7.1 | 7.1 | 6.9 | 7.0 | 7.0 | 6.9 | 7.0 | 7.0 | 7.0 |
| Viscosity (cP) | 600 | 590 | 620 | 340 | 350 | 280 | 210 | 200 | 180 |
| Properties of Coating | | | | | | | | | |

TABLE 5-continued

Test Results in Application Examples 23–31
(using a mixture of a water soluble resin and an amide compound)

| Application Example | 23 | 24 | 25 | 26 | 27 | 28 | 29 | 30 | 31 |
|---|---|---|---|---|---|---|---|---|---|
| Composition | | | | | | | | | |
| pH | 9.1 | 9.0 | 9.1 | 9.1 | 9.0 | 9.0 | 9.1 | 9.1 | 9.0 |
| Viscosity (cP) | 1490 | 1480 | 1500 | 1460 | 1360 | 1440 | 1290 | 1290 | 1280 |
| Properties of Coated Paper | | | | | | | | | |
| Water Resistance: WP Process | 3.4 | 3.6 | 3.0 | 2.9 | 3.0 | 3.5 | 2.9 | 2.9 | 2.6 |
| Ink Acceptability: | | | | | | | | | |
| Process A | 3.2 | 3.5 | 3.4 | 2.7 | 2.9 | 3.6 | 2.8 | 2.7 | 2.7 |
| Process B | 3.3 | 3.6 | 3.5 | 2.8 | 3.0 | 3.4 | 3.0 | 2.7 | 2.6 |

TABLE 6

Test Results in Application Examples 14 and 32–39
(using mixtures of water soluble resins and amide compounds)

| Application Example | 14 | 32 | 33 | 34 | 35 | 36 | 37 | 38 | 39 |
|---|---|---|---|---|---|---|---|---|---|
| No. of Synthetic Example for Water Soluble Resin | 8 | 8 | 8 | 8 | 8 | 9 | 9 | 9 | 9 |
| No. of Synthetic Example for Amide Compound | 13 | 15 | 15 | 17 | 18 | 14 | 15 | 16 | 18 |
| Amount | 10 | 10% | 20% | 10% | 10% | 5% | 10% | 5% | 10% |
| Properties of Aqueous Solution of Resin Component | | | | | | | | | |
| pH | 7.0 | 7.0 | 6.9 | 7.0 | 7.0 | 6.9 | 7.0 | 6.9 | 6.9 |
| Viscosity (cP) | 280 | 270 | 340 | 250 | 270 | 730 | 780 | 750 | 780 |
| Properties of Coating Composition | | | | | | | | | |
| pH | 9.1 | 9.0 | 9.0 | 9.1 | 9.1 | 9.0 | 9.0 | 9.1 | 9.0 |
| Viscosity (cP) | 1330 | 1330 | 1350 | 1320 | 1330 | 1570 | 1470 | 1450 | 1470 |
| Properties of Coated Paper | | | | | | | | | |
| Water Resistance: WP Process | 4.0 | 4.1 | 4.2 | 3.9 | 4.1 | 3.7 | 4.2 | 3.7 | 4.2 |
| Ink Acceptability: | | | | | | | | | |
| Process A | 3.9 | 4.0 | 4.2 | 3.7 | 4.0 | 3.6 | 3.8 | 3.5 | 3.8 |
| Process B | 3.8 | 4.1 | 4.2 | 3.7 | 4.0 | 3.6 | 3.7 | 3.5 | 3.8 |

TABLE 7

Test Results in Application Examples 40–47
(using a mixture of a water soluble resin and an amide compound)

| Application Example | 40 | 41 | 42 | 43 | 44 | 45 | 46 | 47 |
|---|---|---|---|---|---|---|---|---|
| No. of Synthetic Example for Water Soluble Resin | 10 | 10 | 10 | 11 | 11 | 12 | 12 | 12 |
| No. of Synthetic Example for Amide Compound | 13 | 15 | 17 | 14 | 16 | 13 | 13 | 18 |
| Amount | 30% | 5% | 20% | 40% | 10% | 5% | 10% | 20% |
| Properties of Aqueous Solution of Resin Component | | | | | | | | |
| pH | 6.9 | 7.0 | 7.0 | 6.8 | 7.0 | 7.0 | 7.0 | 7.0 |
| Viscosity (cP) | 440 | 350 | 300 | 500 | 600 | 500 | 520 | 550 |

TABLE 7-continued

Test Results in Application Examples 40–47
(using a mixture of a water soluble resin and an amide compound)

| Application Example | 40 | 41 | 42 | 43 | 44 | 45 | 46 | 47 |
|---|---|---|---|---|---|---|---|---|
| Properties of Coating Composition | | | | | | | | |
| pH | 9.0 | 9.0 | 9.0 | 9.1 | 9.0 | 9.0 | 9.0 | 9.0 |
| Viscosity (cP) | 1370 | 1350 | 1330 | 1710 | 1410 | 1390 | 1390 | 1400 |
| Properties of Coated Paper | | | | | | | | |
| Water Resistance: WP Process | 4.4 | 4.0 | 4.3 | 4.0 | 3.9 | 3.6 | 3.9 | 4.2 |
| Ink Acceptability: | | | | | | | | |
| Process A | 4.5 | 3.9 | 4.3 | 4.6 | 3.3 | 3.1 | 3.3 | 3.6 |
| Process B | 4.4 | 4.0 | 4.3 | 4.6 | 3.2 | 3.1 | 3.3 | 3.5 |

Application Examples 48–51

To the master color shown in Table 1 were added the aqueous solutions of water soluble resin obtained in Synthetic Example 19–22, respectively, such that the solid content was 0.5 part per 100 parts of the pigment in said master color. The resulting compositions were subjected to solid concentration and pH adjustments in a manner similar to that in Application Examples 1–7. Respective coating compositions were applied to papers and the coated papers were tested in the same manner as in the prior examples. The results are shown in Table 8.

TABLE 8

Test Results in Application Examples 48–51

| Application Example | 48 | 49 | 50 | 51 |
|---|---|---|---|---|
| No. of Synthetic Example for Reaction Product | 19 | 20 | 21 | 22 |
| Properties of Coating Composition | | | | |
| pH | 9.0 | 9.0 | 9.1 | 9.0 |
| Viscosity (cP) | 1440 | 1510 | 1680 | 1390 |
| Properties of Coated Paper | 4.4 | 4.5 | 3.0 | 2.8 |
| Water Resistance: WP Process | | | | |
| Ink Acceptability: | | | | |
| Process A | 4.2 | 4.4 | 3.1 | 2.8 |
| Process B | 4.2 | 4.4 | 3.2 | 2.9 |

Application Examples 52–57

To the master color shown in Table 1 were added the aqueous solutions of water soluble resin obtained in Synthetic Example 23–28, respectively, such that the solid content is 0.5 part per 100 parts of the pigment in each said master color batch. The resulting compositions were subjected to solid concentration and pH adjustment in a manner similar to that in Application Examples 8–12. Respective coating compositions were applied to papers and the coated papers were tested in the same manner. The results are shown in Table 9.

TABLE 9

Test Results in Application Examples 52–57

| Application Example | 52 | 53 | 54 | 55 | 56 | 57 |
|---|---|---|---|---|---|---|
| No. of Synthetic Example for Reaction Product | 23 | 24 | 25 | 26 | 27 | 28 |
| Properties of Coating Composition | | | | | | |
| pH | 9.1 | 9.0 | 9.0 | 9.0 | 9.0 | 9.0 |
| Viscosity (pH) | 1400 | 1480 | 1520 | 1440 | 1440 | 1660 |
| Properties of Coated Paper | | | | | | |
| Water Resistance: WP Process | 4.2 | 4.3 | 4.3 | 4.3 | 4.4 | 3.9 |
| Ink Acceptability: | | | | | | |
| Process A | 4.1 | 4.4 | 4.1 | 4.1 | 4.2 | 3.7 |
| Process B | 4.2 | 4.3 | 4.1 | 4.1 | 4.1 | 3.6 |

Comparative Synthetic Example 1

Into a four-necked flask equipped with a thermometer, a reflux condenser and a stirrer was charged 435 g (3 moles of glyoxal) of 40% aqueous glyoxal solution and, keeping it at 16° C. while stirring, 60 g (1 mole) of urea was added. The mixture was gradually heated up to 45° C. over 1 hour. Then, the mixture was kept at that temperature for 4.5 hours, and after confirming the fact that pH became constant, it was cooled to 20° C. Then, 0.85 g of 50% aqueous sodium hydroxide solution and 3.5 g of water were added to the mixture to give an aqueous solution of block glyoxal resin having a solid content of 46.9% and pH of 6.9.

Comparative Synthetic Example 2

Into a vessel similar to that used in Comparative Synthetic Example 1 was charged 406 g (2.8 moles of glyoxal) of 40% aqueous glyoxal solution and, keeping it at 15° C. with stirring, 60 g (1 mole) of urea was added. The mixture was gradually heated up to 46° C. over 1 hour. Then the mixture was kept at that temperature for 4 hours, and it was cooled to 20° C. Then, 4 g of 10% aqueous sodium hydroxide solution was added to the mixture to give an aqueous solution of block glyoxal resin having a solid content of 47.3% and pH of 6.0.

Comparative Synthetic Example 3

Into a vessel similar to that used in Comparative Synthetic Example 1 was charged 464 g (3.2 moles of glyoxal) of 40% aqueous glyoxal solution and, keeping it at 12° C. while stirring, 60 g (1 mole) of urea was added. The mixture was gradually heated up to 44° C. over 1 hour. Then, the mixture was kept at that temperature for 4 hours, and cooled to 20° C. Then, 4 g of 10% aqueous sodium hydroxide solution was added to the mixture to give an aqueous solution of block glyoxal resin having a solid content of 46.5% and pH of 6.0.

Comparative Application Examples 1–4

To the master color shown in Table 1 were added the aqueous solutions of resin obtained in Comparative Synthetic Example 1–3, respectively, such that the solid content was 0.5 part per 100 parts of the pigment in each said master color batch to give compositions for Comparative Application Examples 1–3. For Comparative Application Example 4, the master color shown in Table 1 was used as is without adding an aqueous solution of resin. The compositions were subjected to solid concentration and pH adjustments in a manner similar to that in Application Examples. Respective coating compositions were applied to papers and the coated papers were tested in the same manner. The results are shown in Table 10.

TABLE 10

Results in Comparative Application Examples 1–4

| Comparative Application Example | 1 | 2 | 3 | 4 |
|---|---|---|---|---|
| No. of Comparative Synthetic Example for Resin | 1 | 2 | 3 | — |
| Properties of Coating Composition | | | | |
| pH | 9.1 | 9.1 | 9.1 | 9.1 |
| Viscosity (cP) | 1550 | 1500 | 1590 | 1200 |
| Properties of Coated Paper | 2.0 | 1.7 | 2.2 | 1.5 |
| Water Resistance: | | | | |
| WP Process | | | | |
| Ink Acceptability: | | | | |
| Process A | 1.8 | 1.6 | 2.0 | 1.5 |
| Process B | 1.7 | 1.7 | 2.0 | 1.5 |

What is claimed is:

1. A water soluble resin which is formulated by a method comprising:

reacting at least a polyamine (a) selected from the group consisting of alkylene diamines and polyalkylene polyamines with at least one urea compound (b) to obtain a reaction product; and reacting said reaction product with a cross-linking compound (c) selected from the group consisting of alkylene glycol diglycidyl ethers, polyoxyalkylene glycol diglycidyl ethers, aromatic diglycidyl ethers, trimethylol propane triglycidyl ether, sorbitol diglycidyl ether, sorbitol triglycidyl ether, sorbitol tetraglycidyl ether, sorbitol pentaglycidyl ether, sorbitol hexaglycidyl ether, pentaererythritol diglycidyl ether, pentaererythritol triglycidyl ether, pentaererythritol tetraglycidyl ether and isocyanates having at least two isocyanato groups in a molecule, wherein the amount of the cross-linking compound is within a range of about 0.2 to 1 mole based on 1 mole of the polyamine (a).

2. A water soluble resin of claim 1, wherein a dibasic carboxylic acid compound (d) is added to the reaction of said at least one polyamine (a) and said at least one urea compound (b).

3. A water soluble resin of claim 1, wherein further an alicyclic compound (e) selected from the group consisting of alicyclic amines having at least one activated hydrogen and alicyclic epoxy compounds is added in the reaction.

4. A water soluble resin of claim 1, wherein at least one compound (f) is selected from epihalohydrins and $\alpha,\gamma$-dihalo-$\beta$-hydrins and is added in the reaction of the reaction product with the cross-linking compound (c).

5. A water soluble resin (B) formulated by a method comprising:

reacting at least a polyamine (g) which is selected from the group consisting of alkylene diamines and polyalkylene polyamines, a urea compound (h), a dibasic carboxylic acid compound (i) and a lactam (j) to obtain a reaction product; and reacting the reaction product with a cross-linking compound (k) which is at least one member selected from the group consisting of epihalohydrins, $\alpha,\gamma$-dihalo-$\beta$-hydrins, glycidyl compounds and isocyanates.

6. A water soluble resin of claim 5, wherein an alicyclic compound (1), selected from the group consisting of alicyclic amines having at least one activated hydrogen and alicyclic epoxy compounds, is added in the reaction.

7. A water soluble resin obtained by reacting the water soluble resin of claims 1 or 6 with an amide compound (C) which can be obtained by reacting an $\alpha,\beta$-unsaturated carboxylic acid compound (x) with an amine (y) having a primary or seconndary amino group.

8. A composition comprising a water soluble resin of claims 1 or 6 and an amide compound (C) obtained by reacting an $\alpha,\beta$-unsaturated carboxylic acid compound (x) with an amine (y) having a primary or secondary amino group.

9. A paper coating composition comprising:

(I) a pigment, (II) an aqueous binder, and (III) a water soluble resin of claims 1, 3, 5 or 6.

10. A paper having at least one surface thereof coated at least in part with a coating formed from a coating composition formulated from ingredients which comprise at least one pigment, at least one aqueous binder, and a water soluble resin of claim 1.

11. The water soluble resin of claim 1, wherein the cross-linking compound is resorcin diglycidyl ether.

* * * * *